United States Patent
Schilling et al.

(10) Patent No.: US 9,107,518 B2
(45) Date of Patent: Aug. 18, 2015

(54) APPARATUS FOR HANGING PLANTS

(71) Applicants: Wesley William Schilling, Fremont, CA (US); Scott W. Schilling, Sonora, CA (US)

(72) Inventors: Wesley William Schilling, Fremont, CA (US); Scott W. Schilling, Sonora, CA (US)

( * ) Notice: Subject to any disclaimer, the term of this patent is extended or adjusted under 35 U.S.C. 154(b) by 0 days.

(21) Appl. No.: 14/289,347

(22) Filed: May 28, 2014

(65) Prior Publication Data
US 2014/0353439 A1    Dec. 4, 2014

Related U.S. Application Data

(60) Provisional application No. 61/827,908, filed on May 28, 2013.

(51) Int. Cl.
*F16L 3/00* (2006.01)
*A47G 7/04* (2006.01)
*F16M 11/28* (2006.01)

(52) U.S. Cl.
CPC ............... *A47G 7/041* (2013.01); *F16M 11/28* (2013.01)

(58) Field of Classification Search
CPC ........... A47G 7/04; A47G 7/00; F16M 11/28; F16M 11/2057; F16M 11/125; F16M 11/046
See application file for complete search history.

(56) References Cited

U.S. PATENT DOCUMENTS

| | | | | | |
|---|---|---|---|---|---|
| 1,039,134 | A | * | 9/1912 | Jenkins | 108/139 |
| 1,089,290 | A | * | 3/1914 | Thompson | 248/165 |
| 1,762,545 | A | * | 6/1930 | Carpenter et al. | 248/165 |
| 1,763,748 | A | * | 6/1930 | Best | 403/219 |
| 2,918,243 | A | * | 12/1959 | Johnson et al. | 248/188.7 |
| 3,286,964 | A | * | 11/1966 | McMahan, Jr. et al. | 248/188.7 |
| 3,307,814 | A | * | 3/1967 | Bogar, Jr. | 248/188.5 |
| 4,415,137 | A | * | 11/1983 | Garves | 248/629 |
| 4,712,758 | A | * | 12/1987 | Cuschera | 248/188.7 |
| 4,908,982 | A | * | 3/1990 | Quatrini | 47/39 |
| 2009/0139944 | A1 | * | 6/2009 | Drew et al. | 211/107 |

* cited by examiner

*Primary Examiner* — Amy Sterling

(57) ABSTRACT

An apparatus for hanging plants allows a user to create 360 degree displays using potted plants. A support structure includes a support pole and a base. The base stabilizes the support pole in a position normal to the resting surface of the base. The support pole is cylindrical and can be separated into a top pole and a bottom pole for ease of storage and transportation. Similarly, the base can be separated into a top support leg and a bottom support leg. At least one plant hanger is positioned around the support pole by an attachment portion. A support arm portion of the plant hanger extends away from the support pole, while a receiving portion provides means for supporting a potted plant. The support pole can be alternatively supported using an at least one support pole mount that suspends the support pole off of the ground.

5 Claims, 12 Drawing Sheets

APPARATUS FOR HANGING PLANTS

The current application claims a priority to the U.S. Provisional Patent application Ser. No. 61/827,908 filed on May 28, 2013.

FIELD OF THE INVENTION

The present invention relates generally to horticulture. More specifically, the present invention provides a system for hanging plants in order to create unique visual displays.

BACKGROUND OF THE INVENTION

Plants are often used to provide decorative displays both indoors and outdoors. Many plants are commonly planted in pots which can then be placed in various locations around the home, office, etc. Oftentimes it is desirable to hang these potted plants in order to create unique decorative displays. Attempts at plant hangers have been made, however, these designs offer limited options in regards to the positioning of the potted plants. Some potted plants are supported above by wires or chains, however, this requires an adequate support beam above to support the weight of the plant. Additionally, plant supports of this nature can be both difficult to install and remove. Other plant hangers allow potted plants to be attached to columns having a square cross section. While these column hangers are more readily installed, these column plant hangers are limited in the number of positions that plants can be placed around the column, as they can only be placed on one of four sides of the column. Neither type of plant hanger provides a user with enough freedom in the way that plants are positioned and ultimately displayed to others.

Therefore it is the object of the present invention to provide an apparatus for hanging plants, which can be used to create 360 degree displays. The present invention has a support structure formed from a support pole and a base. The support pole has a circular cross section, which allows a plurality of plant hangers to extend in any direction when attached to the support pole. The support pole is anchored in place by the support pole. Once the plurality of plant hangers have been set in the desired position along the support pole, potted plants can be placed within the receiving portion of each of the plurality of plant hangers in order to create unique floral displays.

DETAIL DESCRIPTIONS OF THE INVENTION

All illustrations of the drawings are for the purpose of describing selected versions of the present invention and are not intended to limit the scope of the present invention.

Figure 3:
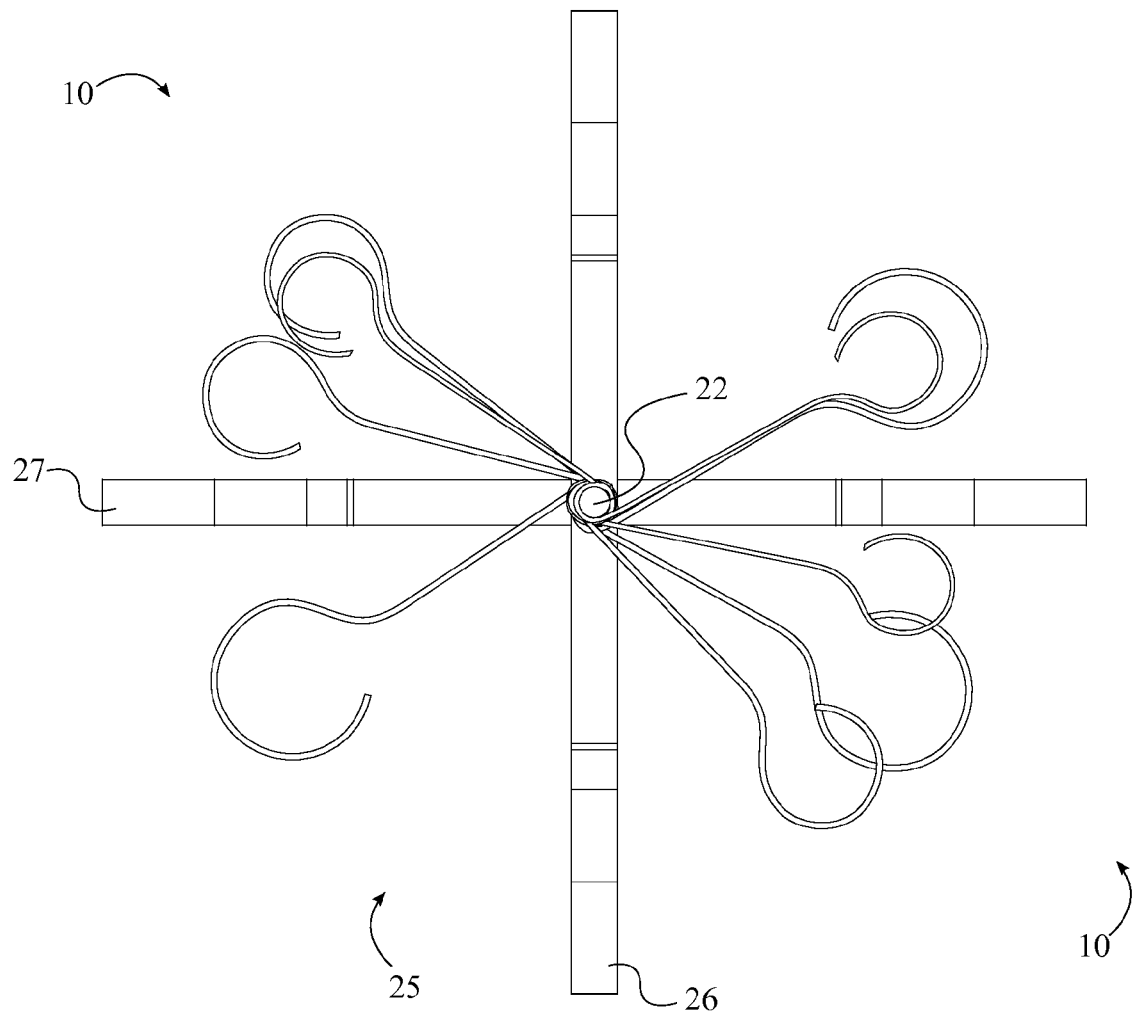
FIG. 3 is a top elevational view of the apparatus for hanging plants in the preferred embodiment of the present invention.

The present invention is an apparatus for hanging plants. The present invention comprises a support structure 20 and at least one plant hanger 10. The support structure 20 comprises a support pole 21 and a base 25. The base 25 provides an anchor 29 for the support pole 21 and ensures that the present invention does not fall over. Each plant hanger 10 is positioned along the support pole 21 and is used to support a potted plant. Additionally, each plant hanger 10 can be positioned 360 degrees around the support pole 21, as depicted in FIG. 3. Although the at least one plant hanger 10 is used to support potted plants in the preferred embodiment of the present invention, the at least one plant hanger 10 may be used to support any other objects.

Figure 1:
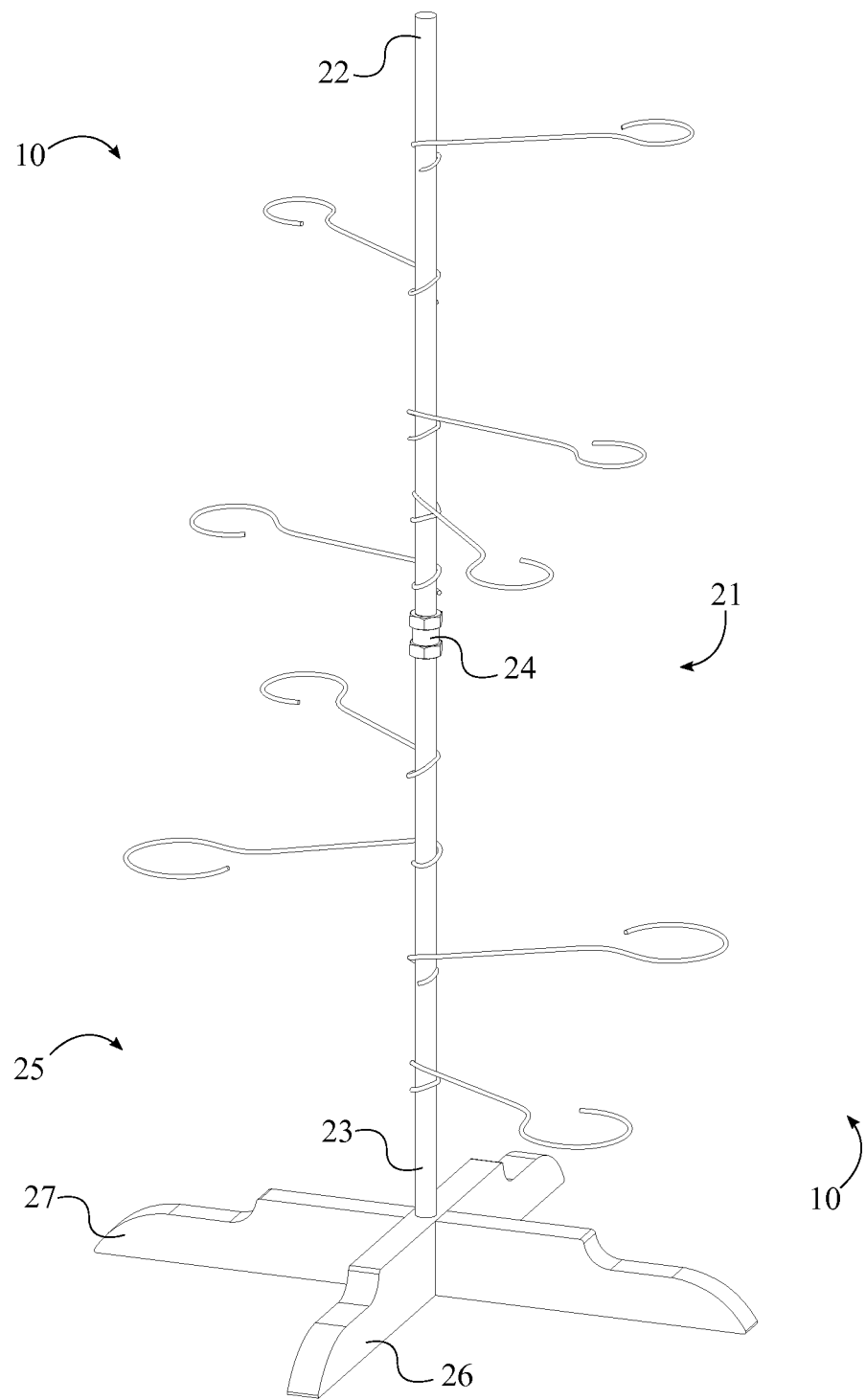
FIG. 1 is a perspective view of the apparatus for hanging plants in the preferred embodiment of the present invention.
Figure 2:
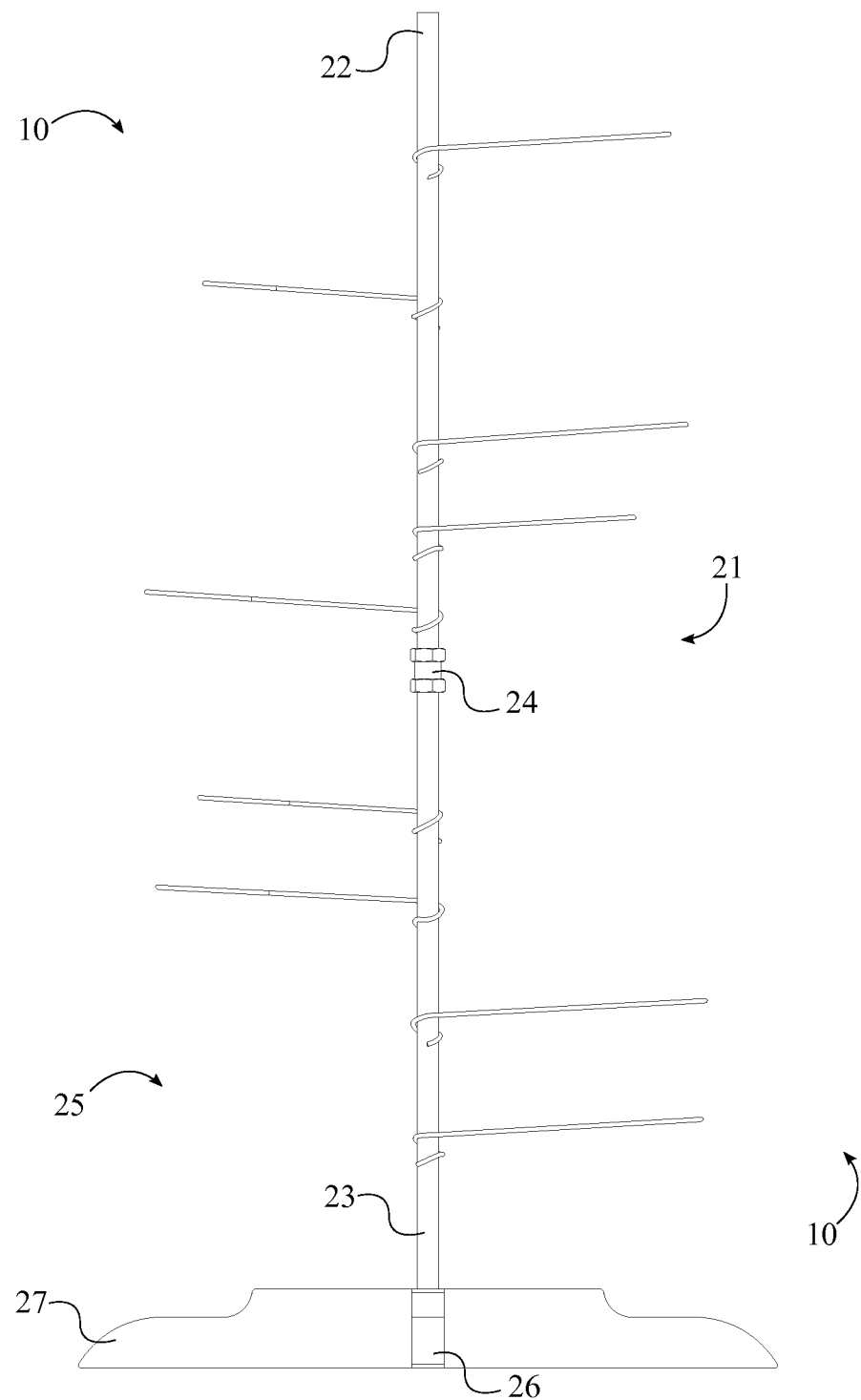
FIG. 2 is a front elevational view of the apparatus for hanging plants in the preferred embodiment of the present invention.

In reference to FIG. 1-2, the base 25 provides a stabilized mount for bracing the support pole 21. As such, the support pole 21 is adjacently attached to the base 25, wherein the support pole 21 is extended upright in a vertical position normal to the surface on which the base 25 is resting. The support pole 21 is a generally cylindrical member, which allows each plant hanger 10 to be positioned in any direction when attached to the support pole 21. In the preferred embodiment of the present invention, the support pole 21 is constructed from metal, while the base 25 is constructed from wood, however, it is possible for any material or combination of materials to be used for either the base 25 or the support pole 21.

Figure 4:
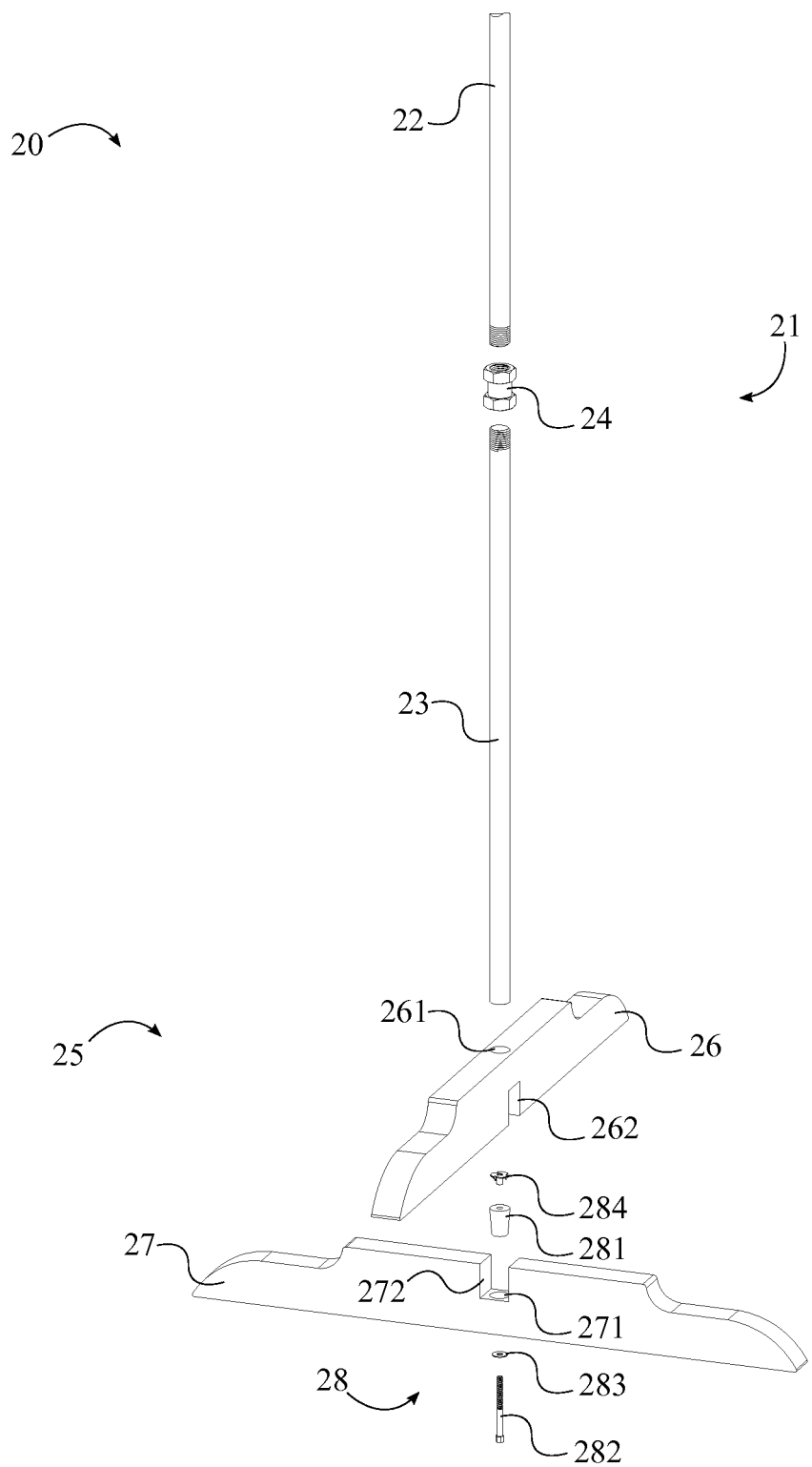
FIG. 4 is an exploded view of the support structure in the preferred embodiment of the present invention.

In reference to FIG. 4, the support pole 21 comprises a top pole 22, a bottom pole 23, and a coupler 24. The coupler 24 is a straight tube-like member that is positioned in between the top pole 22 and the bottom pole 23. The top pole 22 and the bottom pole 23 are adjacently attached to the coupler 24, wherein the coupler 24 is positioned in between the top pole 22 and the bottom pole 23. In the preferred embodiment of the present invention, the top pole 22 and the bottom pole 23 are attached to the coupler 24 by means of a threaded interaction, although it is possible for any other means of attachment to be used. This allows the support pole 21 to be readily disassembled in order to provide easier storage, increased portability, etc. In other embodiments of the present invention, it is also possible for the top pole 22 to be directly attached to the bottom pole 23, or permanently connected to the bottom pole 23.

Figure 5:
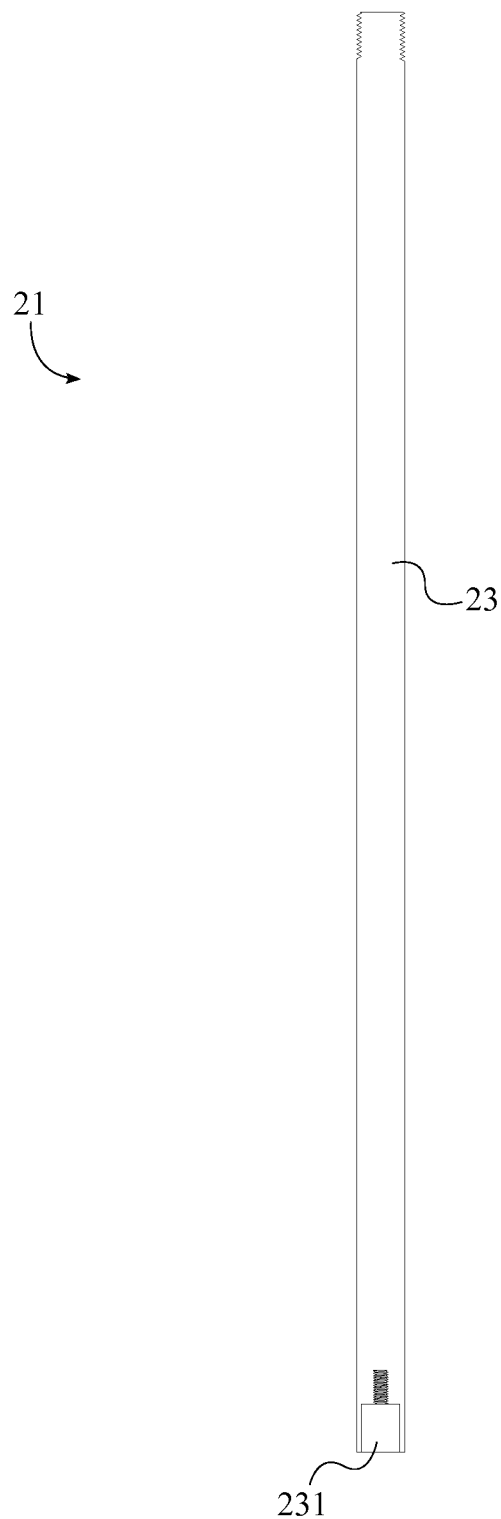
FIG. 5 is a front sectional view of the bottom pole in the preferred embodiment of the present invention.

The top pole 22 and the bottom pole 23 each have a circular cross section of constant diameter, which allows each plant hanger 10 to be positioned 360 degrees around the support pole 21. In reference to FIG. 5, the bottom pole 23 comprises a base connector 231, through which the bottom pole 23 is adjacently attached to the base 25. The base connector 231 is positioned on the bottom pole 23 opposite the coupler 24. The base connector 231 provides a means of attachment between the bottom pole 23 and the base 25. In the preferred embodiment of the present invention, the base connector 231 is a threaded recess, however, it is possible for the base connector 231 to utilize any other means of connection.

The support pole 21 is held in place by the base 25, which acts as an anchor 29 to stabilize the present invention on the desired surface. In reference to FIG. 4, the base 25 comprises a top support leg 26, a bottom support leg 27, and a connector assembly 28. The top support leg 26 comprises a first dado 262 that is cut into the bottom surface of the top support leg 26, about the midpoint of the top support leg 26. The bottom support leg 27 comprises a second dado 272 that is cut into the top surface of the bottom support leg 27, about the midpoint of the bottom support leg 27. The first dado 262 is interlocked with the second dado 272, such that the top support leg 26 is adjacently attached to the bottom support leg 27 to form a single foundation structure.

In further reference to FIG. 4, the bottom support pole 21 is adjacently attached to the base 25. The top support leg 26 comprises a receiving channel 261 that is positioned adjacent to the first dado 262. As such, the receiving channel 261 is centrally positioned along the top support leg 26 and traverses through the top support leg 26 from top to bottom. The bottom pole 23 is inserted through the receiving channel 261. The bottom support leg 27 comprises a connector cavity 271 that is positioned adjacent to the second dado 272. As such, the connector cavity 271 is centrally positioned along the bottom support pole 21 and traverses through the bottom support leg 27 from top to bottom. The connector cavity 271 provides a recess for which the connector assembly 28 is positioned within.

The connector assembly 28 is the portion of the base 25 to which the support pole 21 is adjacently attached and comprises a stop 281, a bolt 282, a washer 283, and a T-nut 284. The washer 283 is positioned into the bottom support leg 27 opposite the connector cavity 271, while the stop 281 is positioned opposite the washer 283, into the connector cavity 271 of the bottom support leg 27. The T-nut is positioned into the stop 281, such that the stop 281 is positioned in between the washer 283 and the tee-nut. The bolt 282 traverses through the washer 283, the bottom support leg 27, the stop 281, and the T-nut 284 from the bottom to the top of the bottom support leg 27. The bolt 282 is then positioned into the support pole 21. More specifically, the bottom pole 23 is threaded onto the bolt 282 through the base connector 231 of the bottom pole 23.

The washer 283 provides a wear pad and spacer between the bottom support leg 27 and the bolt 282. As the bolt 282 is threaded through the T-nut 284, the prongs of the T-nut 284 dig into the stop 281, clamping the stop 281 between the T-nut 284 and the bottom support leg 27. The stop 281 expands as the bolt 282 is tightened, creating a secure frictional fit within the connector cavity 271. In the preferred embodiment of the present invention, the stop 281 is constructed from rubber, however, it is possible for other materials to be used. It is possible for the connector assembly 28 to utilize any other means of attachment between the bottom pole 23 and/or the bottom support leg 27. It is also possible for any other type of base to be used to anchor 29 the support pole 21.

Each plant hanger 10 is slidably attached to the support pole 21. Each plant hanger 10 can be constructed in any size as to accommodate variously sized potted plants, and can be designed to provide any length of extension from the support pole 21. In the preferred embodiment of the present invention, each plant hanger 10 is constructed from aluminum, however, it is possible for any other material or combination of materials to be used. In reference to FIG. 6, each plant hanger 10 is a bent rod and comprises a receiving portion 13, a support arm portion 12, and an attachment portion 11; the support arm portion 12 being positioned in between the receiving portion 13 and the attachment portion 11.

In reference to FIG. 7-10, the attachment portion 11 is helical and has a constant inner diameter, wherein the inner diameter is slightly larger than the diameter of the top pole 22 and the bottom pole 23, such that the attachment portion 11 may be positioned around the support pole 21. Additionally, the helical design allows the attachment portion 11 to be rotated 360 degrees around the support pole 21. Each plant hanger 10 is held in place by a frictional attachment between the attachment portion 11 and the support pole 21 due to the weight of the support arm portion 12, receiving portion 13, and the potted plant. The support arm portion 12 supports the weight of the potted plant and creates a separation between the potted plant and the support pole 21.

Figure 11:
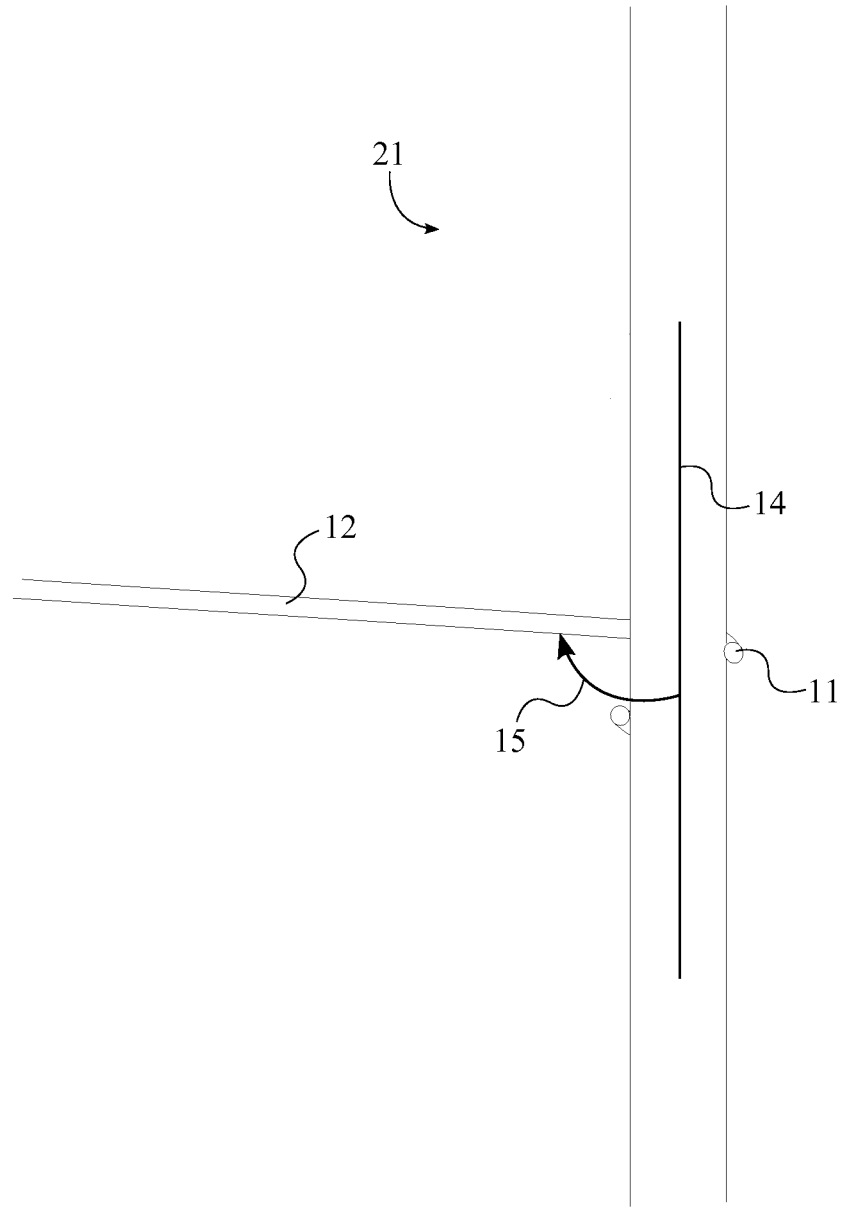
FIG. 11 is a front sectional view of the at least one plant hanger attached to the support pole, showing the hanger axis and the hanger angle.

In reference to FIG. 11, a hanger axis 14 traverses concentrically through the attachment portion 11 and is used to define a hanger angle 15. The hanger angle 15 defines the orientation of the attachment portion 11 in relation to the support arm portion 12. In the preferred embodiment of the present invention, the hanger angle 15 is approximately 93-95 degrees, such that the support arm portion 12 is angled approximately 3-5 degrees from the horizontal when each plant hanger 10 is attached to the support pole 21 with no potted plant being supported. The hanger angle 15 compensates for the weight of the potted plant, such that the support arm portion 12 of each plant hanger 10 does not sag below a 90 degree angle in relation to the support pole 21 when a potted plant is being supported.

Figure 6:
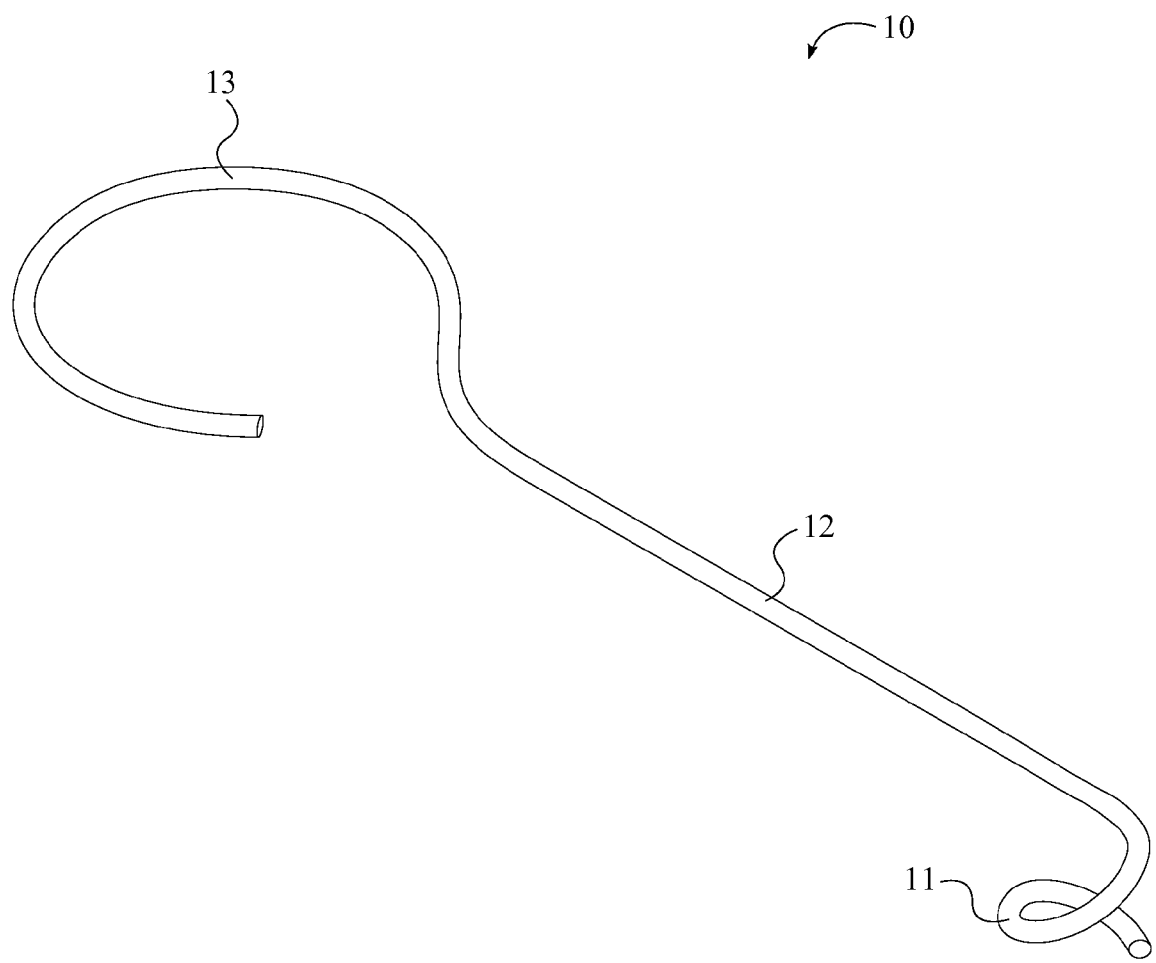
FIG. 6 is a perspective view of one of the at least one plant hanger in the preferred embodiment of the present invention.
Figure 7:
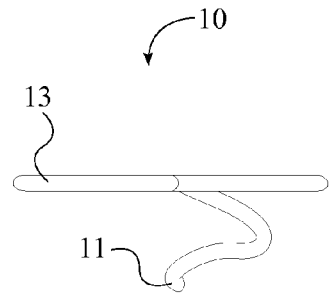
FIG. 7 is a front elevational view of the at least one plant hanger in the preferred embodiment of the present invention.
Figure 8:
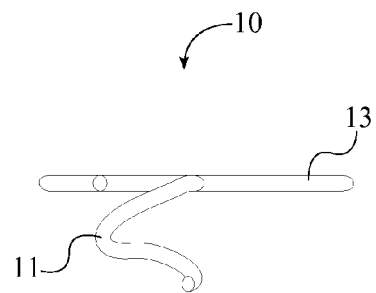
FIG. 8 is a rear elevational view of the at least one plant hanger in the preferred embodiment of the present invention.
Figure 9:
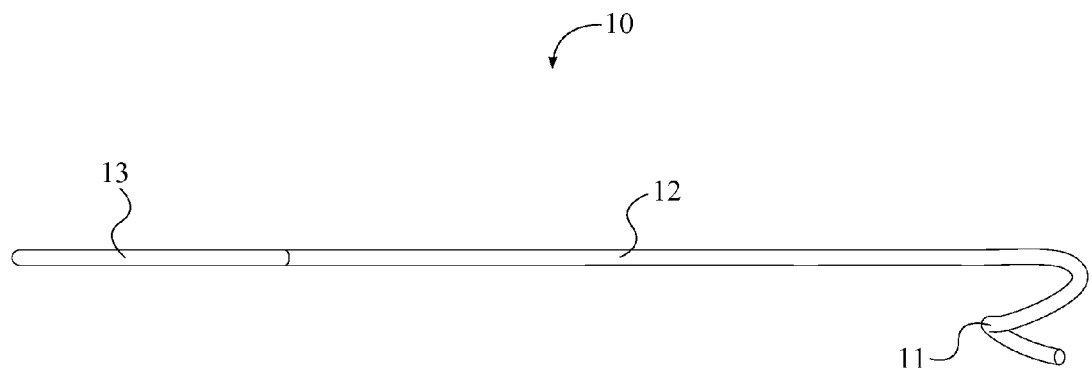
FIG. 9 is a right side elevational view of the at least one plant hanger in the preferred embodiment of the present invention.
Figure 10:
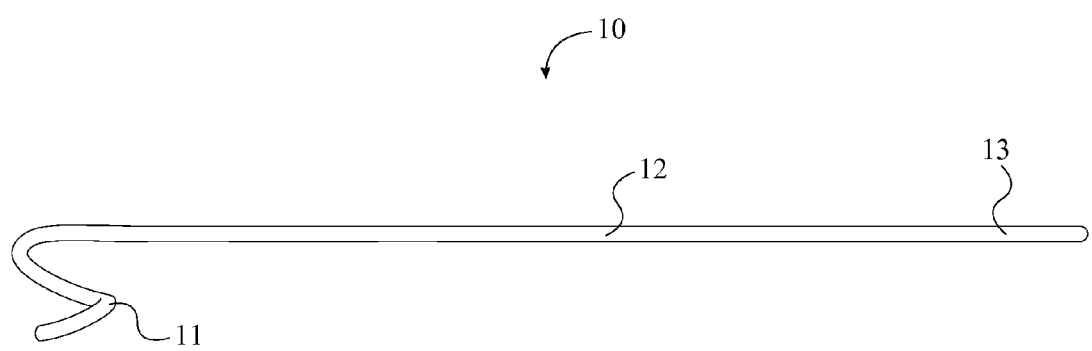
FIG. 10 is a left side elevational view of the at least one plant hanger in the preferred embodiment of the present invention.

In reference to FIG. 6, the receiving portion 13 is a curved portion of each plant hanger 10 that also supports the weight of the potted plant and is the portion of each plant hanger 10 to which the potted plant is attached. In the preferred embodiment of the present invention, the receiving portion 13 forms an open loop/hook for supporting a potted plant. The potted plant is positioned through the open loop, wherein the receiving portion 13 is positioned around the pot and securely holds the pot in place. The diameter of the open loop can be varied as to accommodate variously sized pots. It is also possible for the loop to be closed.

Figure 12:
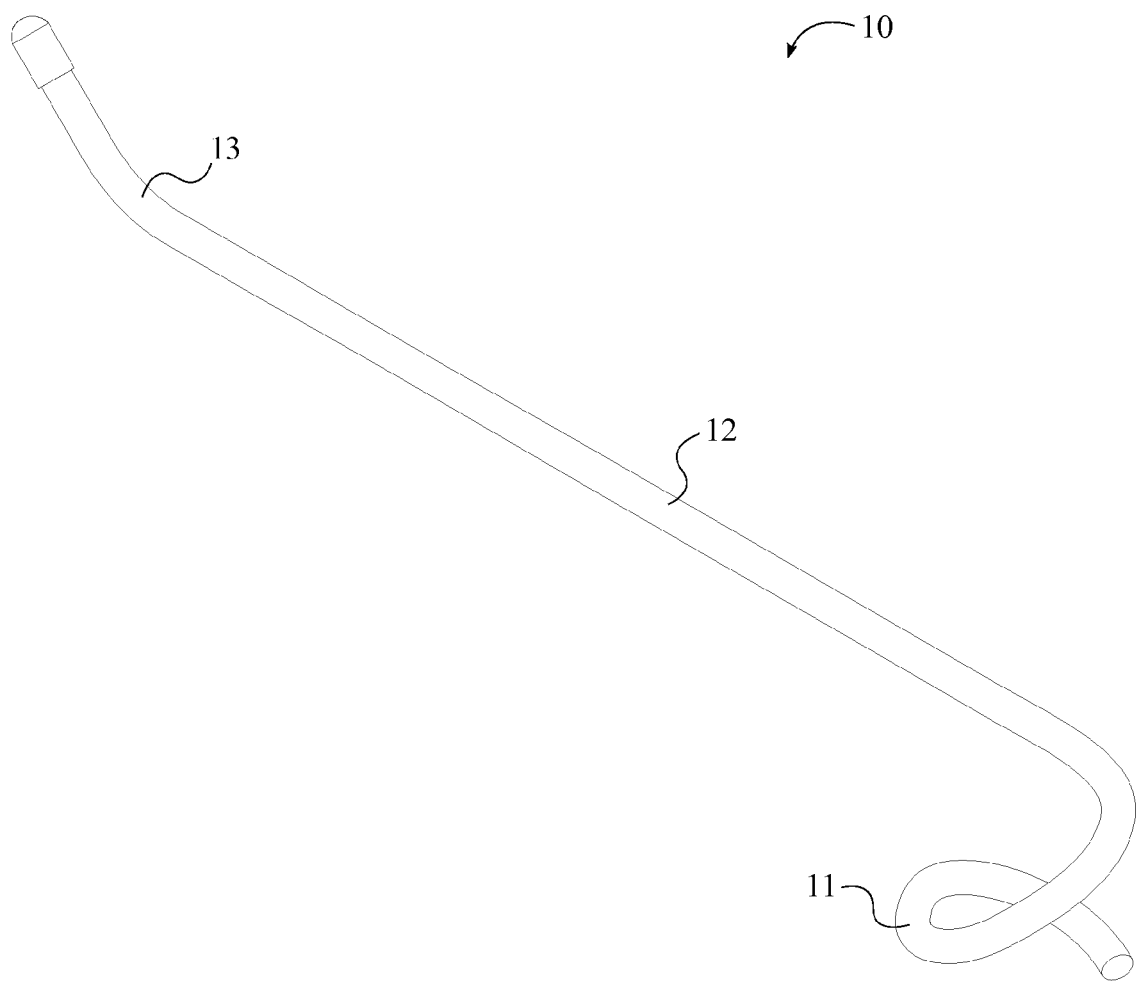
FIG. 12 is a perspective view of the at least one plant hanger in an alternative embodiment of the present invention.
Figure 13:
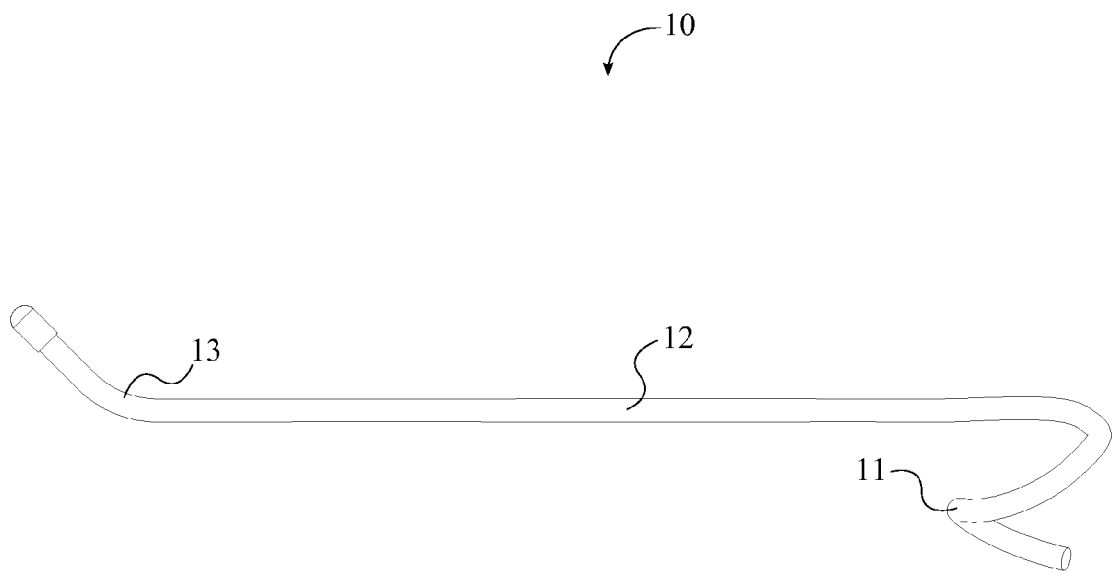
FIG. 13 is a right side elevational view thereof.

In reference to FIG. 12-13, in an alternative embodiment of the present invention, the receiving portion 13 is curved upwards, away from the supporting arm. Preferably the receiving portion 13 is curved upwards at a 45 degree angle, however, the receiving portion 13 can be curved upwards at any angle. In this embodiment, a potted plant can be hung from a handle or strap that is connected to the pot. The handle or strap is hung around the receiving portion 13 and rests in the curve of the receiving portion 13, while the section of the receiving portion 13 that extends upwards prevents the handle or strap from sliding off of the receiving portion 13.

Figure 15:
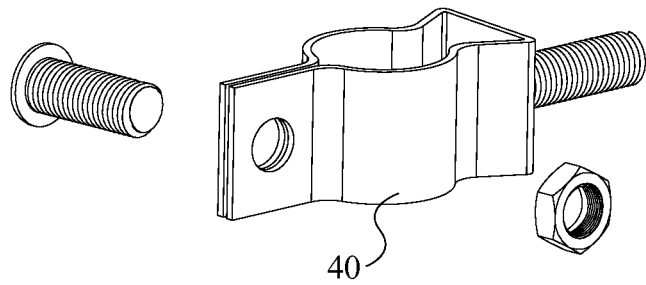
FIG. 15 is an exploded view of the support pole mount in an alternative embodiment of the present invention.
Figure 16:
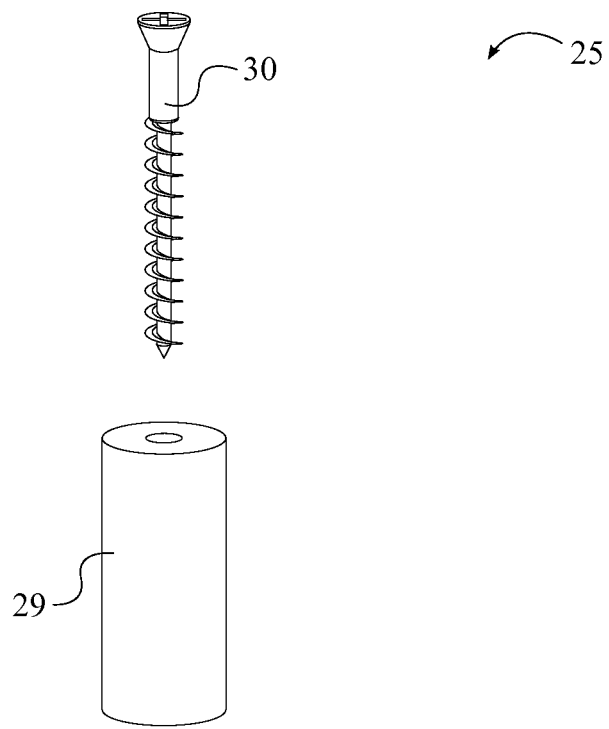
FIG. 16 is an exploded view of the base in an alternative embodiment of the present invention.

In reference to FIG. 15-16, in an alternative embodiment of the present invention, the present invention further comprises at least one support pole mount 40. Additionally, the base 25 comprises an anchor 29 and an anchor screw 30 as opposed to the top support leg 26, the bottom support leg 27, and the connector assembly 28. The anchor 29 is a cylindrical member with a hole drilled through the center from top to bottom. The anchor screw 30 is attached to the anchor 29, wherein the anchor screw 30 traverses though the hole in the anchor 29 from the top of the anchor 29. The anchor screw 30 is then threaded into a first surface, such as a deck, concrete, or wood, securing the anchor 29 in place. Preferably, the anchor screw 30 is a spax screw, however, it is possible for any type of threaded member to be used.

Figure 14:
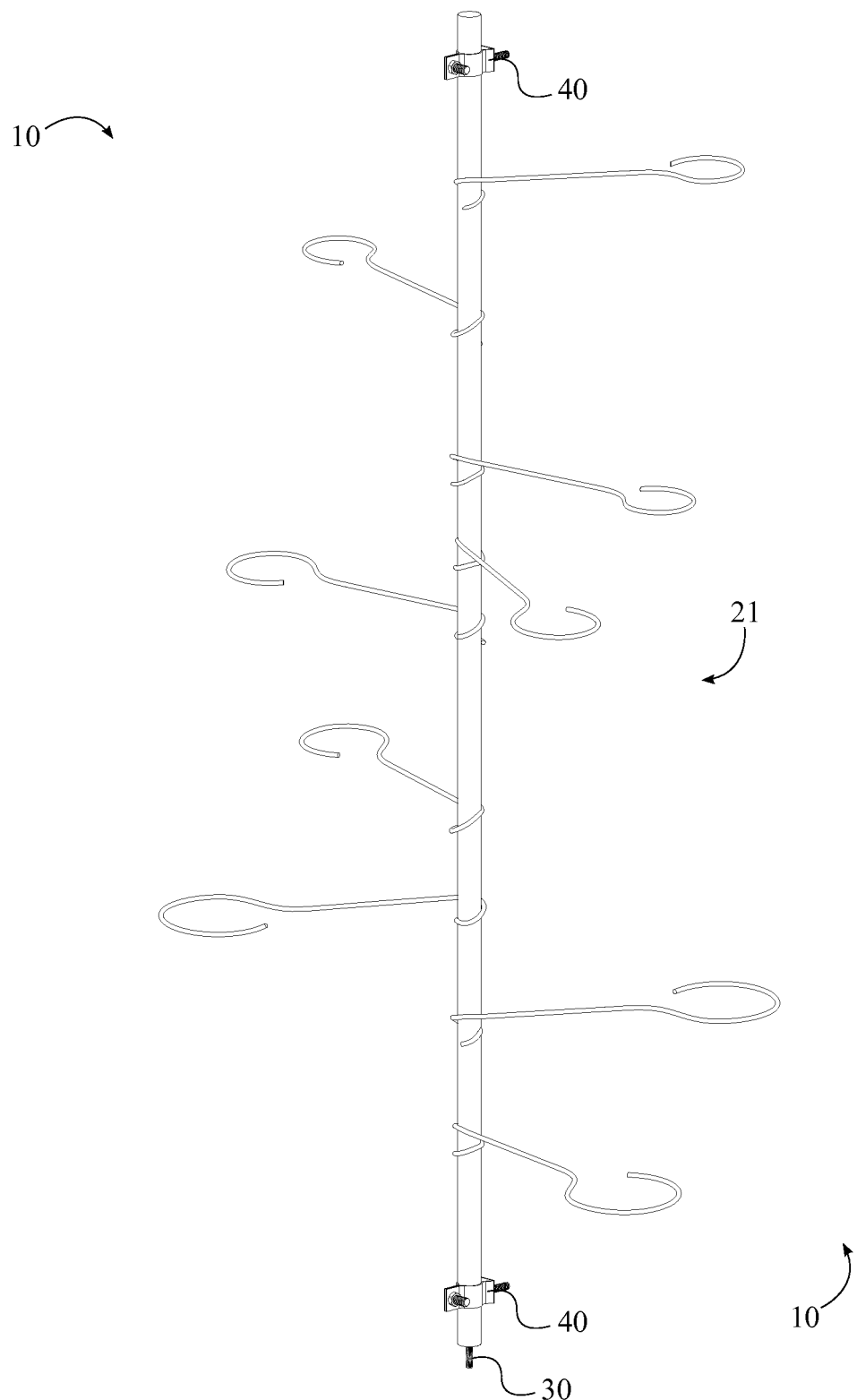
FIG. 14 is a perspective view of the support pole being alternatively supported.

In reference to FIG. 14, the base connector 231 of the bottom pole 23 provides a recess for engaging the bottom pole 23 with the anchor 29. The support pole 21 is placed over top of the anchor 29, wherein the anchor 29 is positioned into the base connector 231 of the bottom pole 23. In this way, the support pole 21 is held in an upright position, normal to the first surface. The at least one support pole mount 40 is positioned around the support pole 21 and is used to anchor 29 the support pole 21 to a second surface that is perpendicular to the first surface, such as a wall. In this way, the support pole mount 40 is connected to the support pole 21 and prevents the support pole 21 from falling over. The support pole mount 40 is attached to the second surface and surrounds the support pole 21. The at least one support pole mount 40 can be a pipe hanger, clamp, or other similar device that is screwed into or otherwise attached to the second surface.

Preferably, the at least one support pole mount 40 is a pipe hanger. A mount screw traverses through the back of each of the at least one support pole mount 40 and acts to anchor each of the at least one support pole mount 40 to a vertical surface made of wood, stucco, metal, etc. Once the support pole 21 is positioned through each of the at least one support pole mount 40, a nut and bolt are used to secure each of the at least one support pole mount 40 closed. The bolt traverses through a front portion of the at least one support pole mount 40 and the nut is then attached to the bolt and tightened in order to clamp the two sides of the at least one support pole mount 40 around the support pole 21.

It is also possible for the support pole 21 to be mounted to a vertical surface using only the at least one support pole mount 40, wherein at least two support pole mounts are utilized. Each support pole mount 40 is positioned along the vertical surface in a line. The support pole 21 is then positioned through each support pole mount 40, wherein the support pole 21 is suspended above the ground along the vertical surface.

Although the invention has been explained in relation to its preferred embodiment, it is to be understood that many other possible modifications and variations can be made without departing from the spirit and scope of the invention as hereinafter claimed.

What is claimed is:

1. A plant hanger assembly comprises:
an at least one plant hanger;
a support structure;
each of the at least one plant hanger comprises a receiving portion, a support arm portion, and an attachment portion;
the support structure comprises a support pole and a base;
the support arm portion being positioned in between the receiving portion and the attachment portion;
the attachment portion being helical, wherein the attachment portion has a constant diameter;
a hanger axis traversing concentrically through the attachment portion;
the hanger axis being positioned at a hanger angle in relation to the support arm portion;
the receiving portion being curved;
the support pole being adjacently attached to the base;
the at least one plant hanger being slidably attached to the support pole;
the attachment portion being positioned around the support pole;
the base comprises a bottom support leg and a connector assembly;
the connector assembly being positioned into the bottom support leg;
the support pole being adjacently attached to the connector assembly;
the connector assembly comprises a stop, a bolt, a washer, and a T-nut;
the washer being positioned into the bottom support leg;
the stop being positioned into the bottom support leg opposite the washer;
the T-nut being positioned into the stop; and
the bolt traversing through the washer, the bottom support leg, the stop, and the T-nut.

2. The plant hanger assembly as claimed in claim 1 comprises:
the support pole comprises a top pole, a bottom pole, and a coupler;
the top pole and the bottom pole being adjacently attached to the coupler;
the coupler being positioned in between the top pole and the bottom pole; and
the bottom pole being adjacently attached to the base.

3. The plant hanger assembly as claimed in claim 1 comprises:
the base comprises a top support leg and a bottom support leg;
the top support leg being adjacently attached to the bottom support leg; and
the support pole traversing through the top support leg.

4. The plant hanger assembly as claimed in claim 3 comprises:
the top support leg comprises a first dado;
the bottom support leg comprises a second dado; and
the first dado being interlocked with the second dado.

5. The plant hanger assembly as claimed in claim 1 comprises:
the connector assembly comprises a stop and a bolt;
the stop being positioned into the bottom support leg; and
the bolt traversing through the bottom support leg and the stop, and into the support pole.

* * * * *